United States Patent Office 3,197,858
Patented Aug. 3, 1965

3,197,858
PROCESS FOR DIFFUSION-BONDING
William Feduska, Emsworth, and Walter L. Horigan, Jr., Pittsburgh, Pa., assignors to Westinghouse Electric Corporation, East Pittsburgh, Pa., a corporation of Pennsylvania
No Drawing. Filed July 28, 1961, Ser. No. 127,484
5 Claims. (Cl. 29—494)

This invention is directed to a method for diffusion-bonding high-temperature alloy members in substantially the solid state, and to alloys incorporating a diffusible element for use in practicing the method.

High-temperature alloys are at present generally brazed with relatively low melting, nickel-base brazing alloys. These nickel-base brazing alloys, which melt within the range of 1000° C. to 1200° C. perform satisfactorily in numerous brazing applications. However, they do have certain disadvantages particularly in that they are inherently hard and brittle, and the joints brazed with these alloys tend to exhibit these same characteristics.

In a copending application, Serial No. 855,530, filed November 27, 1959, now Patent No. 3,145,466, by William Feduska, one of the present co-inventors, there is disclosed the use of beryllium as a diffusible element suitable for use in diffusion-bonding. In that disclosure elemental beryllium is placed upon the surfaces to be joined either by painting the surfaces with a suitable beryllium-containing slurry, or by a vapor deposition process.

In another copending application, Serial No. 2,358, filed January 14, 1960, by William Feduska et al., the beryllium is incorporated in a thin workable alloy sheet which is preplaced at the joint interface between members. The assembly is then heated to a temperature within a critical temperature range to promote diffusion of the beryllium across the joint and the development of a strong bond, while the members and the alloy sheet remain substantially in the solid state.

The present invention is an improvement over both of these copending applications.

This invention is directed to the application of a plurality of highly diffusible elements which may be incorporated, singly and in combination, in alloy sheets suitable for use in diffusion bonding processes.

Accordingly, it is a primary object of this invention to provide a method for joining high-temperature alloy members by diffusion-bonding, in which at least one highly diffusible element selected from the group consisting of boron, carbon and silicon is provided in a material or alloy suitable for preplacing at the joints interface.

It is another object of this invention to provide a relatively thin metal alloy sheet in which at least one highly diffusible element selected from the group consisting of boron, carbon and silicon is present as a minor but essential constituent of the alloy.

Other objects and advantages of the invention will in part be obvious, and will, in part, appear hereinafter.

This invention is directed to a diffusion-bonding process suitable for use with many high-temperature alloys for joining such alloy members into structures suitable for use at elevated temperatures. The method generally comprises the steps of, assembling at least two high-temperature alloy members having surfaces closely conforming to each other and disposing between the conforming surfaces a thin sheet of an alloy containing an effective amount of at least one element selected from the group consisting of boron, carbon and silicon, heating the assembly in a protective environment to a temperature of at least 900° C. for at least 20 seconds. The temperature for heating may range up to 1250° C. or higher, while time at temperature may be as long as an hour or even longer depending upon the material being bonded and the bonding temperature. The diffusible element or elements present in the alloy sheet diffuse rapidly into the adjoining surfaces of the high-temperature alloy members. This migration of the diffusible elements is accompanied by accelerated inter-diffusion of the base elements of the assembly. Thus, there is formed a metallurgical bond comprising a strong alloy joint containing a small amount of the diffusible element therein. The joint may be and usually is characterized by grain growth across the interfaces.

The diffusion bonding procedures of this invention may be applied to nickel, iron and cobalt base alloys. The alloys may contain one or more of titanium, molybdenum, chromium, manganese, aluminum, vanadium and tungsten in substantial proportions. Pure nickel, iron and cobalt can be bonded as well as alloys thereof.

In producing the present invention, it was found that a diffusible element, to be suitable for diffusion-bonding, should possess certain critical properties. The element should diffuse at a very rapid rate into the base metal or metals which are to be joined. While all metallic elements are capable of diffusing in the solid state to some extent, those elements of interest here must have a very rapid rate of diffusion. Such elements are referred to hereafter as "highly diffusible elements." Intrinsically, elements of small atomic radii tend to rapidly diffuse into various base metals. The highly diffusible element should also exhibit appreciable solubility in the base metal or metals which are to be joined so that solid solution structures may preferentially form at the interface, rather than brittle intermetallic compounds. The highly diffusible element should also exhibit some solubility in the various metals with which it might be conveniently alloyed therewith and workable into the form of thin sheets containing the diffusible element or elements.

Carbon has been found to meet these criteria and is suitable for use as a highly diffusible element in the diffusion-bonding process. The carbon atom has a very small atomic radius (0.77 angstroms) and will rapidly diffuse into base metals. Also, carbon exhibits substantial solubility in various elements, such as cobalt, iron, manganese, nickel and titanium. During diffusion of low carbon concentrations into these elements or alloys containing these elements, solid solutions are formed with the carbon.

Carbon may be provided at the surfaces to be joined in a number of different ways. One or both of the members to be joined might be surface carburized and, at diffusion temperature, the carbon redissolves into the matrix material and then diffuses across the interface to facilitate bonding. Carbon deposition, as by painting a suspension of carbon in a neutral liquid on the faying surfaces is also a satisfactory method of providing the required carbon concentration. Since, as pointed out above, carbon is soluble in a number of elements, preparation of alloys containing carbon in solution which can be processed into thin strip is another very satisfactory method of supplying the required concentration of carbon at the joint interfaces.

The element silicon has also been found to be useful as a highly diffusible element for diffusion-bonding heat-resisting alloys. The silicon atom has a relatively small atomic radius (1.17 angstroms) and is capable of rapid diffusion into certain base materials. Silicon exhibits substantial solubility in numerous elements between room temperature and diffusion-bonding temperature and diffusion-bonding transport alloys may be prepared therefrom.

Boron is still another element which is useful as a highly diffusible element for diffusion-bonding heat-resisting alloys. The boron atom is relatively small (0.97 angstrom) and is known to rapidly diffuse into various types of high-temperature alloys. Boron, too, is soluble in numerous elements and alloys for diffusion-bonding may be prepared therefrom.

The thin bonding alloy sheets carrying at least one of carbon, boron and silicon should contain at least about 0.1% of these elements. For practical reasons, at least 0.2% of carbon, boron, or silicon or a combination of two or more is desirable. Greater proportions, up to 10% for example, may be present in the sheets. The maximum amount is determined by the base metal in which the carbon, silicon or boron are present since the solubility thereof in such metal will vary. While the diffusion element may be present in a thin sheet of bonding alloy, the bonding alloy may be in other form, such for example, as a powder, woven wire strip or the like. While the process may be more difficult to carry out and be less controllable, pure carbon, silicon or boron in powder form may be suspended in a neutral liquid and painted on the faying surfaces. As mentioned previously, alloy bonding sheets have proven most satisfactory in use.

To evaluate carbon as a highly diffusible element in a diffusion-bonding alloy a transport alloy of carbon-nickel was prepared. From 0.23 to 0.65 weight percent carbon is soluble in nickel at the diffusion-bonding temperatures of 1000° C. to 1300° C. However, a practical range of from 0.2% to 0.7% by weight carbon has been determined. Exceeding the solubility limit of carbon in nickel by small amounts is not seriously detrimental. A carbon-nickel diffusion-bonding alloy containing 0.35 weight percent carbon was prepared and it was readily processed to strip stock of 3 to 4 mils in thickness. This alloy is identified hereafter as heat 2406 alloy.

In Table I below, are set forth the compositions of several high temperature alloys which were diffusion-bonded by the process of this invention.

Table II.—*Diffusion-bonding treatments employed on various base metals, using heat 2406 (0.35 weight percent carbon-nickel)*

| Run No. | Base Metal | Bonding Temperature, °C. | Bonding Time, Minutes | Ult. Shear Strength p.s.i. |
|---|---|---|---|---|
| 24 | AISI 347 | 1,225 | 10 | 21,450 |
| 25 | AISI 347 | 1,225 | 10 | 36,600 |
| 35 | Alloy D | 1,125 | 10 | 36,750 |
| 36 | Alloy D | 1,225 | 10 | 34,050 |
| 28 | Alloy I | 1,150 | 10 | 54,000 |
| 48 | Alloy H | 1,225 | 10 | 40,400 |

The test results attained in Table II clearly show that the carbon-nickel alloy can be used to produce joints having substantial strength. Nickel-base alloys, containing from 0.20 to 0.70 percent carbon can be used to diffusion-bond a variety of high-temperature alloys. In these alloys, carbon remains in solution in nickel at working temperatures to enable the alloy to be formed into thin strip stock. Then, when this strip stock is preplaced at the interfaces between base alloys which are to be joined, and all heated to bonding temperature, the carbon in solution in the nickel is available to diffuse across the interface to facilitate diffusion-bonding. Pressure can assist in achieving intimate contact of the faying faces but is not necessary for diffusion-bonding if the samples are perfectly flat and in contact. While a carbon-nickel diffusion-bonding alloy has been shown, other alloys containing carbon as a diffusible element may also be prepared. These alloys may contain base elements, such as cobalt, iron, manganese, and titanium which all have some solubility for carbon at diffusion-bonding temperatures from about 900° C. to 1300° C. Thus, a cobalt-base alloy containing from 0.2% to 1% carbon may Table I.—*Compositions of high temperature alloys bonded*

| Alloys | Cr | Ni | Co | Mo | W | Cb | Zr | Ti | Al | Mn | Si | C | Fe |
|---|---|---|---|---|---|---|---|---|---|---|---|---|---|
| AISI 347 | 17.0–19.0 | 9.0–12.0 | | | | 10xC | | | | | | [1].08 | Bal. |
| Alloy D | 13.5 | 26.0 | | 2.75 | | | | 1.75 | 0.1 | 0.9 | 0.8 | .04 | Bal. |
| Alloy I | 15.0 | 73.0 | | | | 1.0 | | 2.5 | 0.7 | 0.5 | 0.4 | .04 | 7.0 |
| Alloy H | 20.0 | 10.0 | Bal. | | 15.0 | | | | | 1.5 | [1]1.0 | [1].15 | [1]3.0 |
| Alloy PH | 16–18 | 6.50–7.75 | | | | | | | 0.75–1.50 | [1]1.0 | [1]1.0 | [1].09 | Bal. |
| Alloy N | | 22.9 | 73.0 | | | | | 1.87 | .26 | 0.45 | 0.21 | .01 | 0.23 |

[1] Maximum.

The alloys AISI 347, alloy D, Alloy I and Alloy H of Table I in strip form were polished and degreased and then were diffusion-bonded with heat 2406 alloy strip, which was preplaced between the faying faces of the samples. The type of joint used was a simple overlap having a length equal to the base metal thickness. The bonds were made in a vacuum of from .05 to .07 micron. In making the bonds, pressure was not applied to the interface regions of the samples to facilitate bonding, however, the application of pressure would ensure contact for diffusion-bonding and might be used in particular circumstances. In some cases, incipient melting may occur and the minor amount of molten alloy formed would provide good contact for the solid state diffusion process. The various temperatures and times which were used in the boding process are set forth in Table II. Table II also includes the ultimate shear strength of the diffusion-bonded speciments tested at room temperature.

be employed for diffusion bonding. Alloys of these elements in various combinations with each other and with other alloying elements, such as chromium, molybdenum and tungsten may be used depending upon the composition of the metal members to be joined.

Other diffusion-bonding tests were made with silicon-transport alloys and boron-transport alloys. The useful range of boron is from 0.2% to 2.0% by weight in a cobalt base alloy. The useful range of silicon is from 0.2% to 10% by weight in a nickel base, and from 0.2% to 8% in a cobalt base. Thus, in Table III, polished and degreased strips of the high-temperature alloys, Alloy PH and Alloy N of Table II, are shown to have been bonded with a cobalt-base alloy containing 0.75% by weight boron which is identified as Alloy 2759, and a nickel-base alloy containing silicon in the amount of 1.5% by weight silicon and identified as alloy 2760. The bonds were made in a vacuum of from .05 to .07 microns. No pressure was used to ensure contact in this case.

Table III

| Sample | Base Metal | Bonding Alloy | Bonding Temp., °C. | Bonding Time, minutes | Ult. Shear Strength, p.s.i. |
|---|---|---|---|---|---|
| 1 | Alloy PH | [1] 2,759 | 1,140–1,250 | 5 | 27,100 |
| 2 | Alloy PH | [2] 2,760 | 1,145–1,225 | 5 | 19,100 |
| 3 | Alloy N | 2,759 | 1,145–1,170 | 5 | 56,400 |
| 4 | Alloy N | 2,760 | 1,150–1,200 | 5 | 40,000 |

[1] 0.75 weight percent boron—balance cobalt.
[2] 1.50 weight percent silicon—balance nickel.

The bonds made in the above table were of the simple overlap type with the overlap being 1½ times the base metal thickness of the strip being joined. No pressure was used to make these joints, only surface contact and the weight of the upper member itself.

The strength of the joints obtained using silicon and boron as the highly diffusible elements indicate that very useful joints may be made in this fashion.

The effectiveness of carbon, boron and silicon containing alloys for diffusion-bonding has thus been established. Metals or alloys capable of holding these diffusible elements in solid solution and exhibiting reasonable ductility may be usefully employed as diffusion-bonding alloys as has been illustrated above. Thus, carbon-transport alloys could be comprised of the elements cobalt, iron, manganese and titanium and of alloys of these elements, in various combinations with each other and with other alloying elements, such as chromium, molybdenum and tungsten.

Similarly, silicon exhibits solubility between room temperature and 1300° C., the diffusion-bonding temperature range, in cobalt, chromium, copper, iron, manganese, moylbdenum, nickel, platinum, titanium, tungsten, and zirconium and diffusion-bonding alloys may be made from these elements.

Boron, which exhibits solubility in cobalt, copper, iron, palladium, tantalum and zirconium may be included in alloys of these materials, singly or in combination, for the purpose of providing diffusion-bonding alloys.

In developing alloys suitable for diffusion-bonding and having properties similar to the alloy members joined, it is essential to know the solubilities of the diffusible elements in the various elements of the bonding alloy composition. As an indication of the kind of information required, the following table gives the solubility of silicon in a number of important elements which may be present in bonding alloys:

at temperatures of 900°–1000° C., and they are workable into thin strips which facilitates preplacement between pieces that are to be diffusion-bonded.

Diffusion-bonding alloys may also be made with more than one highly diffusible element contained therein. Thus, combinations of one or more of carbon, boron and silicon may be provided in alloys in which these elements are soluble for diffusion-bonding purposes. In general, those alloys will be used which have a capability of being worked into thin sheet or strip to facilitate preplacement of the highly diffusible element at the faying faces of the base materials which are to be joined.

The bonds made in accordance with this invention were produced in a vacuum environment as indicated, but such vacuum is not esential to the formation of good bonds. Intimate contact of the parts to be joined is far more important.

While sheet of up to .025 inch may be used to obtain diffusion-bonded joints in accordance with this invention, the thinner sheets provide stronger joints, and the preferred range of sheet thickness is .0005 inch to .005 inch. As it is used in this description and the claims the word "sheet" includes strip and foil.

Although the present invention has been described with particular reference to preferred embodiments, it will be apparent to those skilled in the art that variations and modifications may be made without departing from the essential spirit and scope of the invention. It is intended to include all such variations and modifications.

We claim as our invention:

1. In diffusion-bonding process for joining alloy members into structures suitable for use at elevated temperatures, the steps comprising, positioning a thin metal sheet containing at least one highly diffusible element selected from the group consisting of carbon, boron and silicon, carbon, when present, amounting to from 0.2% to 1%, by weight; boron, when present, amounting to from 0.2% to 2%, by weight; silicon, when present, amounting to from 0.2% to 10%, by weight, between and in intimate contact with the alloy members at closely conforming

Table IV

| Element | Silicon Solubility in Element, Wt. Percent | Temp., °C. | Element | Silicon Solubility in Element, Wt. Percent | Temp., °C. | Element | Silicon Solubility in Element, Wt. Percent | Temp., °C. |
|---|---|---|---|---|---|---|---|---|
| Al | 1.65 / <0.1 | 577 / RT | Ni | 8.0 / 5.0 | 1,150 / RT | V | 7.5 / 5.0 | ~1,840 / 900 |
| Co | ~7.0 / ~7.0 | 1,100 / 775 | Pt | 0.2 / <0.2 | 830 / RT | W | 0.9 / ~0.5 | 1,800 / RT |
| Fe | 13.0 / 5.0 | 1,250 / RT | Rh | 0.5 | RT | Zn | 1.62 / .06 | 850 / 600 |
|  |  |  | Ta | 0.2 | 1,300 |  |  |  |
| Mn | 10.0 / 8.0 | 880 / 600 | Ti | 3.0 / <0.44 | 1,330 / 860 | Zr | 0.2 / 0.1 | 1,600 / 860 |

RT = Room Temperature.

From these data, it is apparent that one attractive series of silicon-transport alloys would include the elements Fe, Ni, Mn, and Co. Nickel-base alloys containing from 20 to 30 weight perecent total of Fe, Mn and Co, with about 8 percent Cr to increase corrosion resistance, and about 4 percent silicon as the highly diffusible element are excellent alloys for bonding for high temperature application. These alloys, containing at least 95% total of Fe, Ni, Mn, Co and Cr, are capable of retaining substantially all the silicon in solution for diffusion-bonding faying surfaces to be joined, the base metal of said metal sheet being capable of forming a solid solution with said diffusible element, heating the assembled members and the sheet in contact with each other to a temperature of at least 900° C. and below the melting point of said alloy sheet for a period of at least 20 seconds, whereby the diffusible element diffuses into the adjacent contacting surfaces of the members and thereby promotes formation of a strong metallurgical bond between the members.

2. The process of claim 1 in which the alloy sheet containing the highly diffusible element is of a thickness of up to 0.025 inch and includes at least 95% total of metals selected from the group consisting of nickel, chromium, manganese, iron and cobalt, with small amounts of incidental impurities.

3. A diffusion-bonding process for joining alloy members into a structure suitable for use at elevated temperatures, the method comprising the steps of, positioning a thin nickel-carbon alloy sheet between the alloy members at the interfaces to be joined to form the desired structure, said alloy sheet comprising from 0.2% to 0.7% carbon and the balance being essentially nickel, heating the structure in a protective environment at a temperature of at least 900° C. in substantially the solid state for at least 20 seconds whereby the carbon diffuses into the alloy members at the interfaces and thereby promotes the interdiffusion of the other elements present at the interfaces to form a strong metallurgical bond.

4. A diffusion-bonding process for joining alloy members into a structure suitable for use at elevated temperatures, the method comprising the steps of, positioning a thin cobalt-boron alloy sheet between the alloy members at the interfaces to be joined to form the desired structure, said alloy sheet comprising from 0.2% to 2.0% boron and the balance being essentially cobalt, heating the structure in a protective environment at a temperature of at least 900° C. in substantially the solid state for at least 20 seconds whereby the boron diffuses into the alloy members at the interfaces and thereby promotes the interdiffusion of the other elements present at the interfaces to form a strong metallurgical bond.

5. A diffusion-bonding process for joining alloy members into a structure suitable for use at elevated temperatures, the method comprising the steps of, positioning a thin nickel-silicon alloy sheet between the alloy members at the interfaces to be joined to form the desired structure, said alloy sheet comprising from 0.2% to 10% silicon and the balance being essentially nickel, heating the structure in a protective environment at a temperature of at least 900° C. in substantially the solid state for at least 20 seconds whereby the silicon diffuses into the alloy members at the interfaces and thereby promotes the interdiffusion of the other elements present at the interfaces to form a strong metallurgical bond.

References Cited by the Examiner

UNITED STATES PATENTS

| | | | |
|---|---|---|---|
| 211,070 | 12/78 | Weston | 75—170 |
| 424,379 | 3/90 | Tilford | 29—498 |
| 1,501,906 | 7/24 | Hybinette | 75—170 |
| 2,585,819 | 2/52 | Moore et al. | |
| 2,844,868 | 6/58 | Cline et al. | 29—498 |
| 3,024,109 | 3/62 | Hoppin et al. | 29—504 X |
| 3,028,235 | 4/62 | Hoppin | 75—171 |

JOHN F. CAMPBELL, *Primary Examiner.*